April 18, 1967  W. G. BUNCHAK  3,314,690
STEERING MECHANISM FOR HAULAGE VEHICLES
Filed Nov. 19, 1963  5 Sheets-Sheet 2

INVENTOR.
WILLIAM G. BUNCHAK,
BY
Parker & Carter
ATTORNEYS.

April 18, 1967 W. G. BUNCHAK 3,314,690
STEERING MECHANISM FOR HAULAGE VEHICLES
Filed Nov. 19, 1963 5 Sheets-Sheet 3

INVENTOR.
WILLIAM G. BUNCHAK,
BY
Parker & Carter
ATTORNEYS.

United States Patent Office 3,314,690
Patented Apr. 18, 1967

3,314,690
STEERING MECHANISM FOR HAULAGE VEHICLES
William G. Bunchak, Chicago Ridge, Ill., assignor, by mesne assignments, to Westinghouse Air Brake Company, Pittsburgh, Pa., a corporation of Pennsylvania
Filed Nov. 19, 1963, Ser. No. 324,770
22 Claims. (Cl. 280—91)

This invention relates generally to a steering mechanism for a multiwheeled vehicle which enables oppositely positioned wheels to be swung through different amplitudes of movement upon the application of a steering force, and specifically to a wheeled vehicle having such a steering mechanism as an integral part thereof. The invention has particular application to shuttle cars used in underground mining.

The steering linkages presently employed on many steerable haulage vehicles, such as shuttle cars used in underground coal mining, do not turn the wheels on opposite sides of the vehicle proper amounts upon the application of a given steering force to invariably insure non-skid steering. Since the turning radius on the inside of the turn is shorter than the turning radius on the outside of the turn, turning of both wheels equal amounts causes one of the wheels, and perhaps both, to skid in relation to the turn surface. If the inside wheel is properly positioned in the sense that its center plane is tangential to the turning radius, the outer wheel may create a plowing or braking effect, particularly if the turning surface is covered with a layer of dust such as is frequently found in underground coal mines.

Many present steering linkages on steerable haulage vehicles are excessively complicated. This is due to the fact that since the front and rear wheels turn in opposite directions when the car turns rather complicated motion reversing mechanisms are employed.

Furthermore the capacity of present cars is generally reduced by the conventional placement of the steering mechanisms between the wheel assemblies that are to be steered and the haulage vehicle body. Since the steering mechanisms have some bulk, clearance between the wheel, in its turn position, and the body must be provided. The provision of clearance at this point requires narrowing of the haulage vehicle carrying chamber throughout its length, since the carrying chamber can be no wider than its narrowest dimension. The result is a loss of carrying capacity which is much greater than the space required to accommodate the externally located steering linkages.

Accordingly, a primary object of this invention is to provide a steering mechanism which functions to swing two sets of wheel assemblies which are spaced unequal radial distances from a common turning center through different amplitudes of turning movement, each wheel assembly being maintained substantially perpendicular to a radial line passing through a common turning center at all times irrespective of the direction of turn.

A further object is to provide a steering mechanism of the type above described which functions to simultaneously control two sets of tandemly disposed wheels whose relative vertical positions with respect to each other may be constantly changing.

Yet a further object is to provide an articulated multiwheeled shuttle car having a steering mechanism of the type described in the preceding paragraphs.

Yet a further object is to provide a shuttle car having an increased carrying capacity as contrasted to present shuttle cars of comparable length, width and weight.

Another object is to provide a shuttle car having a steering mechanism which has an increased wheel turning radius for a given width of body due to the placement of the steering mechanism at a location remote from the minimum clearance area between the wheel and body.

Yet a further object is to provide a differential wheel turning mechanism which automatically turns the wheels in a set of wheels through a greater or lesser amplitude of turning movement for a given application of turning force depending upon the direction in which the wheel is turning, or in other words, whether the wheel is turning on a larger or smaller turning radius.

Yet a further object of the invention is to provide a shuttle car steering mechanism which has shock absorbing characteristics to thereby cushion the system against violent or sudden shocks.

Other objects and advantages of the invention will become obvious from a reading of the following description of the invention.

The invention is illustrated more or less diagrammatically in the accompanying drawings wherein.

Like reference numerals will be used to refer to like or similar parts throughout the separate views of the drawings.

*General description*

Figure 1:
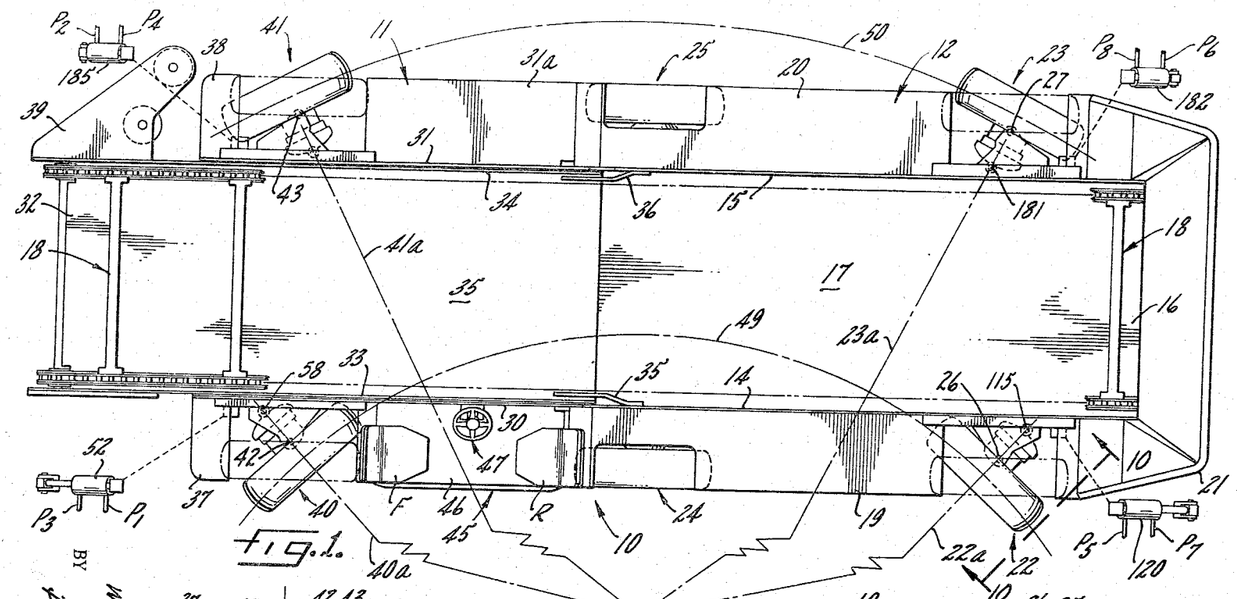
FIGURE 1 is a top plan view of a mine haulage vehicle embodying the steering mechanism of the present invention with the wheel assemblies shown in maximum turn position for a right turn.
Figure 2:
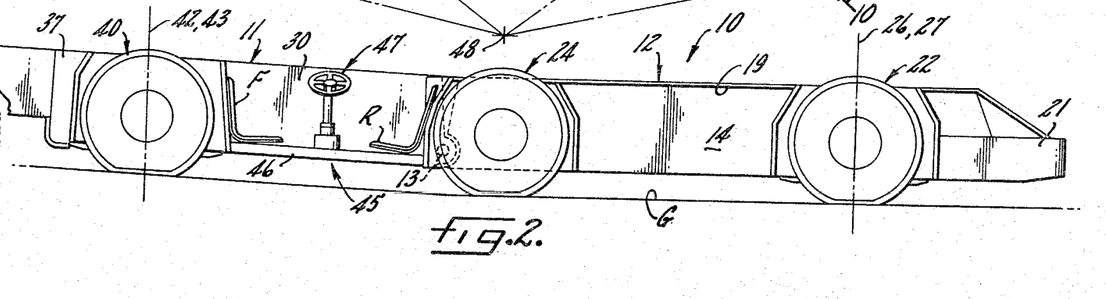
FIGURE 2 is an elevation of the haulage vehicle of FIGURE 1.

A steerable mine haulage vehicle is indicated generally at 10 in FIGURES 1 and 2. In this instance a shuttle car especially adapted for use in underground coal mining operations has been illustrated. Although the steering mechanism which forms the major portion of the invention is particularly well adapted for use in such a shuttle car it should be clearly understood that the invention is not so limited in scope, since the steering mechanism may be applied to other vehicles. An underground shuttle car has been chosen for purposes of description, however, since it is contemplated that this will be its greatest field of application.

In this instance the shuttle car is composed of a pair of body sections, indicated generally at 11 and 12, which are articulatable or pivotable about a common pivot 13. Reference numeral 13 will refer both to the pivot axis and the shaft means about which the two body sections are pivoted. It should also be understood that although an articulatable haulage vehicle has been chosen for purposes of illustration, the invention is not so confined since the invention will have great practical application in rigid body vehicles, such as 4-wheel shuttle cars.

Forward body section 12 consists of a pair of side walls 14 and 15 welded or otherwise suitably secured to a bottom plate 16. The walls and bottom plate form a generally U-shaped carrying chamber 17. A slat conveyor or other conveying means is indicated generally at 18 for loading and discharging material to be transported through the chamber 17. A pair of top plates 19 and 20 are welded or otherwise suitably secured to the upper edges of the side walls 14 and 15, the top plates extending outwardly a distance sufficient to provide, in effect, a shield for mechanism which may be attached to the outside surface of the side walls. A bumper is indicated at 21.

The forward section 12 is supported by a pair of steerable wheel assemblies 22 and 23 located at its forward end and a pair of non-steerable wheel assemblies 24, 25 located adjacent its rearward end. The steerable wheel assemblies 22 and 23 are pivotal about generally upright vertical axes 26 and 27 respectively.

The rear body section 11 includes a pair of outer side walls 30 and 31. A bottom plate is indicated at 32, this plate being integral with a pair of inner side walls indicated at 33 and 34. Overlap plates 35 and 36 which are welded to the rear end portions of forward section side walls 14 and 15 protect the leading edges of inner side walls 33, 34 from impacts received by coal moved through the vehicle by conveyor 18. The bottom plate 32 and inner side walls 33, 34 form the generally U-shaped material carrying chamber 35 which may be elevated to discharge material therefrom at a position above the pivot axis 13. A top plate 31a is welded to the upper edge of side wall 31 and extends outwardly therefrom a distance sufficient to protect the mechanism which may be carried by and attached to the outside surface of side wall 31.

A pair of bumpers are indicated at 37 and 38 and a conventional sheave frame bracket at 39.

The forward end of rear body section 11 is secured in articulating relationship to the front body section by common pivot means 13. The rear end of the body section 11 is supported by a pair of steerable wheel assemblies 40 and 41. These wheel assemblies pivot about generally vertically positioned axes 42 and 43 respectively.

An operator's station is indicated generally at 45. The station includes a bottom plate 46, a forwardly facing seat F and a rearwardly facing seat R. A steering wheel within easy reaching distance of each seat is indicated generally at 47.

In FIGURE 1 the wheels are shown in a position of maximum turn to the right, the direction being taken with respect to the forward direction of movement of the shuttle car. It will be noted that the wheels of wheel assemblies 22 and 40 have been turned to make an angle of approximately 45 degrees with respect to the longitudinal axis of the car, whereas the wheels of left wheel assemblies 23 and 41 have been turned to make an angle of only about 28 degrees with the longitudinal axis of the car. The turning radius of each wheel passes through a common turning center 48, the turning radius for each wheel being designated by its wheel assembly number followed by the suffix a. From FIGURE 1 it will be apparent that wheel assemblies 22 and 40, which are in the inside of the turn, are so positioned that their direction of travel is substantially tangential to a common arc 49.

In line manner the wheels of wheel assemblies 23 and 41, which are on the outside of the turn, are so positioned that their direction of travel is substantially tangential to an arc 50.

The shuttle car is shown on an uneven mine floor G. From the figure it will be noted that the floor or ground to the rear of the shuttle car is at a higher elevation than the ground at the forward end of the car with the result that the body sections 11 and 12 have pivoted a few degrees with respect to one another about pivot means 13.

*Steering system*

The steering mechanism for insuring that the turning radii of the wheel assemblies pass through a common turning point irrespective of the direction of turn is illustrated best in the remaining figures. Attention is first directed to FIGURES 3 and 4.

Figure 3:
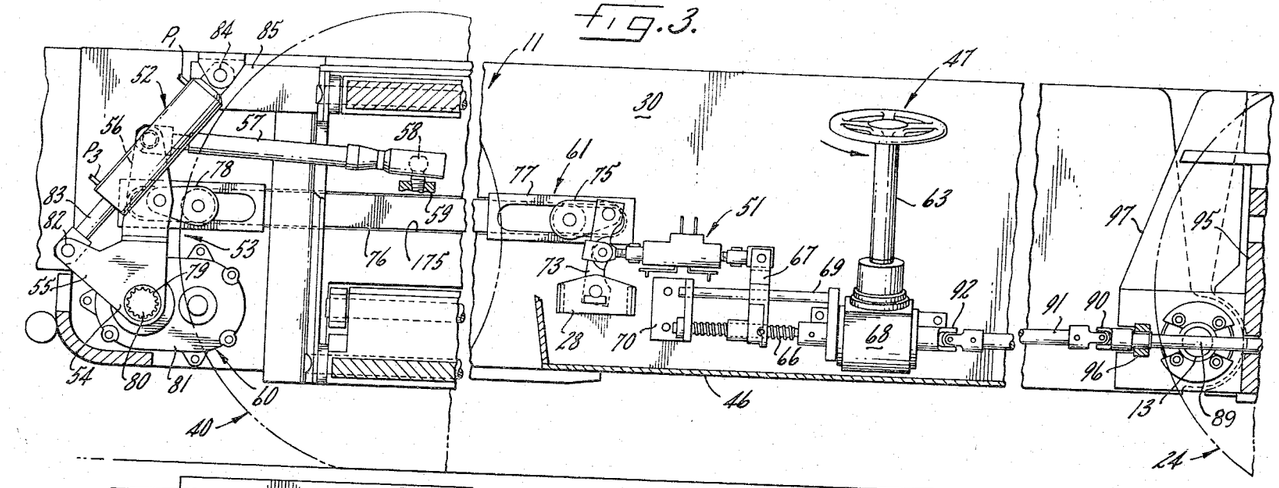
FIGURE 3 is a detail elevational view of that portion of the steering mechanism of the present invention associated with a rear wheel assembly of a mine haulage vehicle, with parts omitted and others shown in section and in phantom for purposes of clarity.
Figure 4:
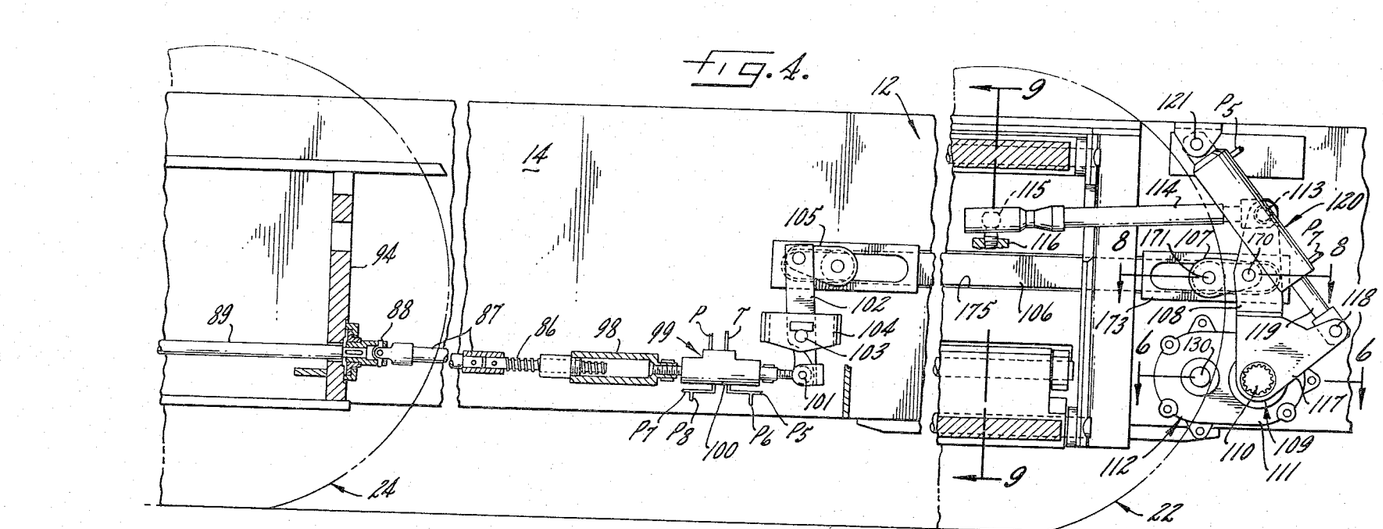
FIGURE 4 is a detail elevational view showing an extension of the steering mechanism of FIGURE 3, again with parts omitted and others shown in phantom and in section for purposes of clarity.

The steering mechanism for turning rear wheel assembly 40 includes the operator-manipulated steering wheel 47, valve means 51, power means or cylinder 52, and a mechanical linkage 53 for applying the turning force from the power means 52 in a direction to turn the wheel assembly 40. The valve means 51 functions to admit high pressure fluid to the power cylinder 52 to thereby apply the turning force available for turning the wheel assembly 40. The mechanical linkage 53 consists essentially of a lever 54, which in this instance is a bell crank having crank arms 55 and 56, and a drag link 57 connected by a ball joint or steering knuckle 58 to a lug 59 which is integral with the wheel assembly 40. Movement of the lug by the drag link causes rotation of the wheel assembly 40 about generally vertical axis 42. For a more detailed showing of the construction and the relationship of the wheel assembly to the remainder of the body structure, reference is made to copending application Serial No. 324,732, filed November 19, 1963, and assigned to the assignee of this application. A differential motion transmitting assembly for turning the wheel assemblies through different amplitudes of movement, depending upon the direction of turn, is indicated at 60. Finally, a stabilizing mechanism for maintaining the wheel assemblies in a turned position until the reception of a subsequent steering force from wheel 47 is indicated generally at 61.

Steering wheel 47 is connected to rotatable steering shaft 63. When the steering wheel is rotated counterclockwise, as indicated by the arrow in FIGURE 3, bevel gear 64 attached to its lower end is likewise rotated counterclockwise. Counterclockwise rotation of bevel gear 64 rotates meshing bevel gear 65 in a direction to rotate ball screw 66 in a direction to shift bracket 67 to the left. The bevel gears rotate in a suitable gear housing 68. Details of the housing and the bearings are not further described since their details per se do not form an essential part of the invention. Bracket 67 slides along a guide rod 69, one end of which is journaled in an extension carried by the housing 68 and the other end in a supporting bracket 70 fastened to side wall 30.

The upper end of the bracket 67 is connected by any suitable means to spool 71 in valve means 51. In this instance a pivoted threaded connection is shown, but it will be understood that it is quite within the scope of the invention to apply other connecting means. The spool reciprocates in valve casing or housing 72, the housing in turn being secured to and movable with a multiplying lever 73 by a pivoted, threaded connector 74. The multiplying lever 73 is pivotally connected by a pocket bracket 28 to the outside surface of side wall 30 at its lower end and, at its upper end, to the stabilizing mechanism 61. The connection of multiplying lever 73 to the stabilizing mechanism 61 includes a pivotal stub link 75 pivotally connected at its forward end to the upper end of the multiplying lever and at its rearward end to a stabilizer bar 76. A guide sleeve is indicated at 77. The stabilizer bar slides in an appropriate opening 175 cut in the side wall 30 of the rear body section 11. See, for reference, FIGURE 9.

The rearwardmost end of stabilizer bar 76 is connected to arm 56 of bell crank lever 54 by a similar stub pivot link 78 and associated structure which is not numbered for purposes of clarity.

Bell crank lever 54 is connected by means of a spline connection 79 to a stub shaft 80, the stub shaft terminating inside the timing mechanism housing 81.

The short crank arm 55 of the bell crank lever is pivotally connected as at 82 to the retractable and extendable piston rod 83 of power cylinder 52. The power cylinder is pivotally mounted to the body structure at 84, the pivot mounting being welded to a rigid supporting bracket 85 which in turn is welded to the outside surface of side wall 30. Similar structure is shown with more clarity in FIGURE 10.

Figure 5:
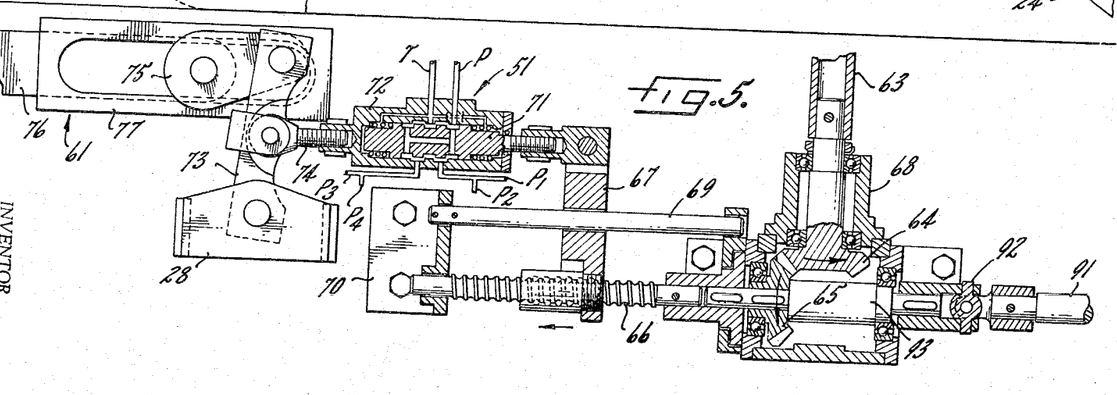
FIGURE 5 is a detail view, to a larger scale, of the valve means and its associated actuating and actuated mechanism of FIGURE 3.

Referring now particularly to FIGURES 4 and 5, rotation of bevel gear 65 and ball screw 66 simultaneously rotates forward ball screw 86, shown in FIGURE 4, in the same direction. Ball screw 86 is connected to bevel gear 65 through common shafting 87, universal joint 88, a second short section of common shafting 89, a second universal joint 90, a third short section of common shafting 91, a third universal joint 92, and finally a stub shaft 93 which is integral with or fastened to bevel gear 65 for rotation therewith. It will be noted from FIGURE 3 that universal joint 90 is located as close to body pivot means 13 as possible. Preferably the point of connection between shaft sections 91 and 89 will be located right on the pivot axis, but since this is not always feasible the combined effect of universal joints 92 and 90 is employed to obtain the desired degree of flexibility. Universal joint 88 accommodates the swing of multiplying lever 102. Shafting 89 passes through the flanges 94 and 95 of a box frame structure which supports the center wheel assembly 24. The left end of shafting 89 is supported in a bearing 96 carried by a connecting block 97. For further details of the connecting structure between adjacent body sections, reference is made to copending application Serial No. 324,732.

Rotation of ball screw 86 induces movement of follower sleeve 98 in the same direction as bracket 67. The follower sleeve is connected by any suitable means to the spool of valve 99, valve 99 being similar in all respects to valve means 51 of FIGURE 3. The casing 100 of valve means 99 is pivotally connected as at 101 to movement multiplying and direction reversing lever 102, the lever 102 being pivotally connected as at 103 to the exterior surface of side wall 14. A pocket bracket is indicated at 104. The upper end of multiplying lever 102 is pivotally connected by a stub pivot link 105 to a stabilizer bar 106 which slides in a cutaway area of side wall 14. The forward end of stabilizer bar 106 is connected by a stub pivot link 107 to the long crank arm 108 of bell crank lever 109. The bell crank lever is pivotally connected by splines to stub shaft 110 which terminates within housing 111 of differential motion transmitting means 112.

The upper end of long crank arm 108 is pivotally connected as at 113 to drag link 114, the inner end of which is pivotally and universally connected to knuckle 115 carried by lug 116 which is integral with the wheel assembly 22.

The outer end of short crank arm 117 is pivotally connected as at 118 to piston rod 119 of power means 120 which, in this instance, is a hydraulic cylinder. The hydraulic cylinder is connected as at 121 to the body structure.

Since the two valves 51 and 99 are substantially identical, only valve 51 will be described in detail.

An inlet line P connects the valve chamber to a source of hydraulic pressure, usually a hydraulic pump. Line T is a return line which connects the valve chamber to a tank which in turn is connected to the pump. Outlet lines are indicated at P1 and P2, the lines communicating with a single outlet port in the valve casing. A pair of return lines is indicated at P3, P4, the return lines communicating with a single inlet port in the valve casing. The return lines are vented to the tank through return line T when the valve spool is in the position shown in FIGURE 5. The pairs of lines, P1, P2 and P3, P4 are alternately high and low pressure lines depending on the direction of turn.

Lines P and T of valve 99 are likewise pump and tank lines respectively. P5 and P6 are outlet lines communicating with the interior of the valves through a single port, and P7 and P8 are return lines communicable with the tank through return line T. When the valve spool of valve 99 is in a position corresponding to the valve spool 71 of FIGURE 5, P5 and P6 are high pressure lines, and P7 and P8 are low pressure lines. The termini of the lines P1–P8 are indicated on power cylinders 52, 120, 182 and 185 of FIGURE 1.

Differential motion transmitting mechanism

Figure 6:
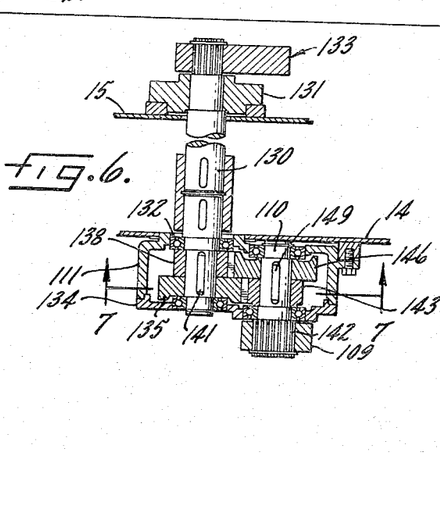
FIGURE 6 is a sectional view taken substantially along line 6—6 of FIGURE 4 illustrating particularly the differential motion transmission means.
Figure 7:
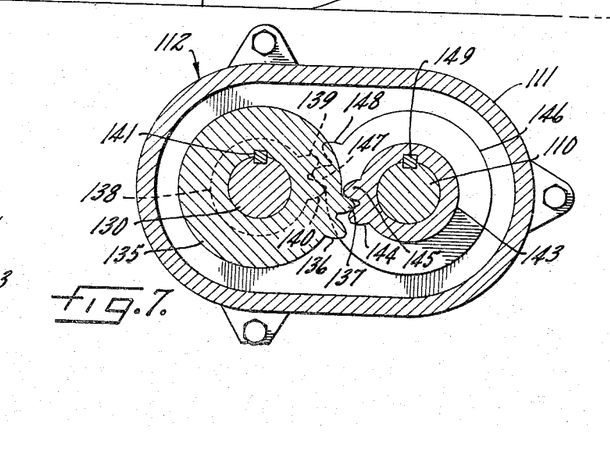
FIGURE 7 is a sectional view, to an enlarged scale, taken substantially along the line 7—7 of FIGURE 6 showing the differential motion transmitting members in a straight ahead position.
Figures 8, 9, 12:
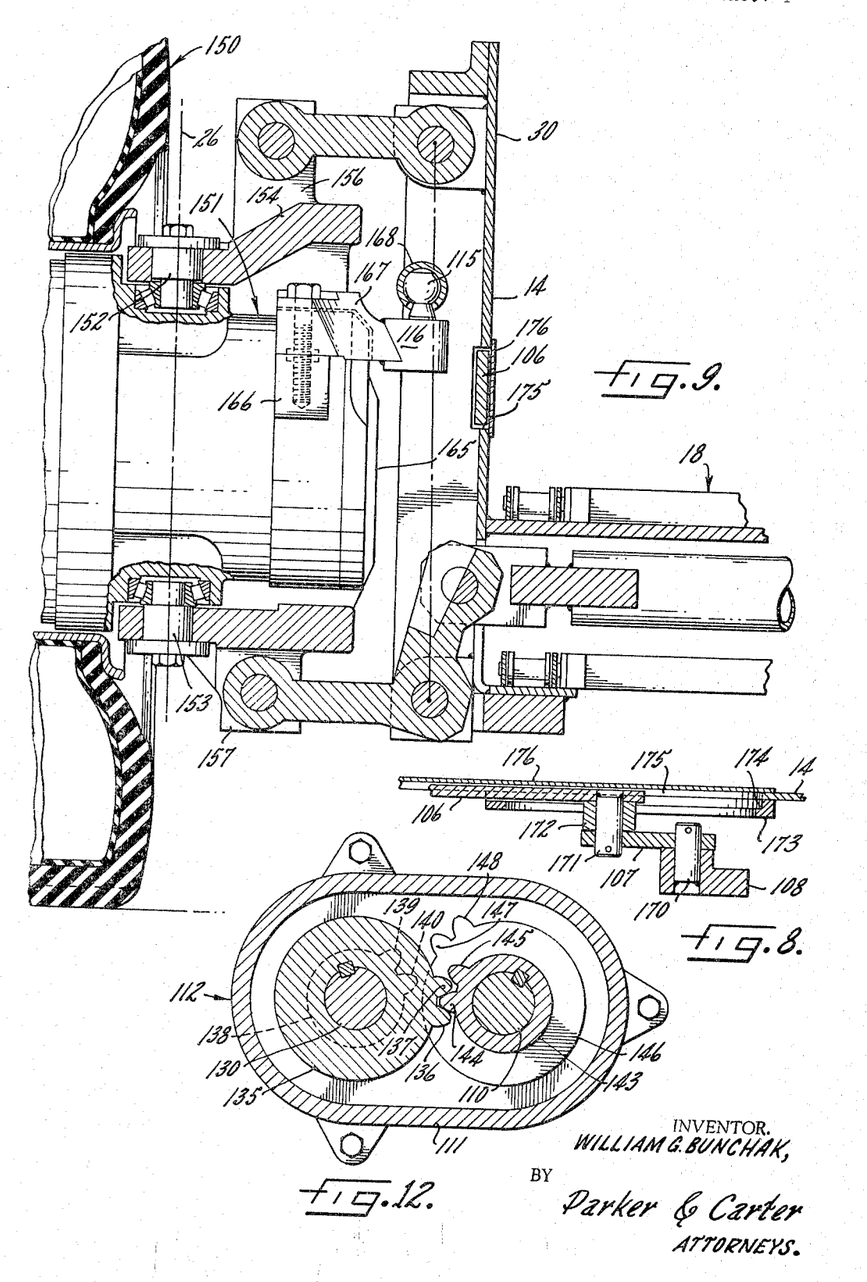
FIGURE 8 is a detail sectional view taken substantially along the line 8—8 of FIGURE 4 illustrating particularly the connection between the steering mechanism stabilizing means link and the wheel turning levers.
FIGURE 9 is a sectional view taken substantially along the line 9—9 of FIGURE 4.
FIGURE 12 is a view similar to FIGURE 7 showing the differential motion transmitting members in a maximum turn position.

The differential motion transmitting mechanism shown best in FIGURES 6, 7 and 12 functions to maintain the wheel assemblies in proper turning relationship to one another irrespective of the direction of turn. That is, irrespective of the direction of turn, the amplitude of swing of the wheel assemblies on the inside of the turn is greater than the amplitude of swing of the wheel assemblies on the outside of the turn, the amplitude of swing in each instance being sufficient to insure that each of the steerable wheel assemblies turns about a common turning center at all times. Since the internal mechanism of each differential motion transmitting assembly is essentially the same only one will be described.

Referring first to FIGURES 6 and 7 it will be noted that the differential motion transmitting mechanism includes a cross shaft 130 which is supported in a bearing block 131 at one end and a ball bearing 132 at its other end. Bearing block 131 is welded or otherwise suitably secured to the outside surface of side wall 15. The bearing block end of the cross shaft is splined for connection to a lever 133 which is similar in contour but reversed, end for end, as lever 109. The lever is shown best in FIGURE 11. The ball bearing 132 is received in housing 111 which is bolted to side wall 14. A housing cover plate is indicated at 134.

The right end of shaft 130, as viewed in the direction of forward movement, carries a pair of gear members. The outermost gear member 135 has a pair of teeth 136, 137 as best seen in FIGURE 7. The inner gear 138 is of smaller diameter than outer gear 135. It likewise has only a pair of teeth 139, 140 shown best in FIGURE 7. Both gears are fixed to cross shaft 130 by a key 141 or any other suitable securing means.

Stub shaft 110 is supported in a pair of bearings located in the opposite faces of the housing 111. The outwardly extending portion of the stub shaft is splined as at 142 to the lever means, in this instance bell crank 109.

Stub shaft 110 also carries two gear members. The outermost gear member is indicated at 143. It has two teeth 144 and 145 formed thereon, the teeth being in meshing engagement with tooth 137 of gear 135. Gear 143 is equal in size to the smaller gear 138 carried by cross shaft 130. The larger gear 146 has two teeth 147, 148, tooth 147 being in meshing engagement with teeth 139 and 140 of smaller gear 138 carried by cross shaft 130. Gear 146 is of the same size as gear 135. Both gears 143 and 146 are secured to stub shaft 110 by key 149 or any other suitable securing means.

Gear members 135 and 143 form one pair of gears, and gears 138 and 146 form a second pair of gear members. It will be noted that correspondingly sized gear members are cross mounted from shaft to shaft.

Wheel assembly

Figure 10:
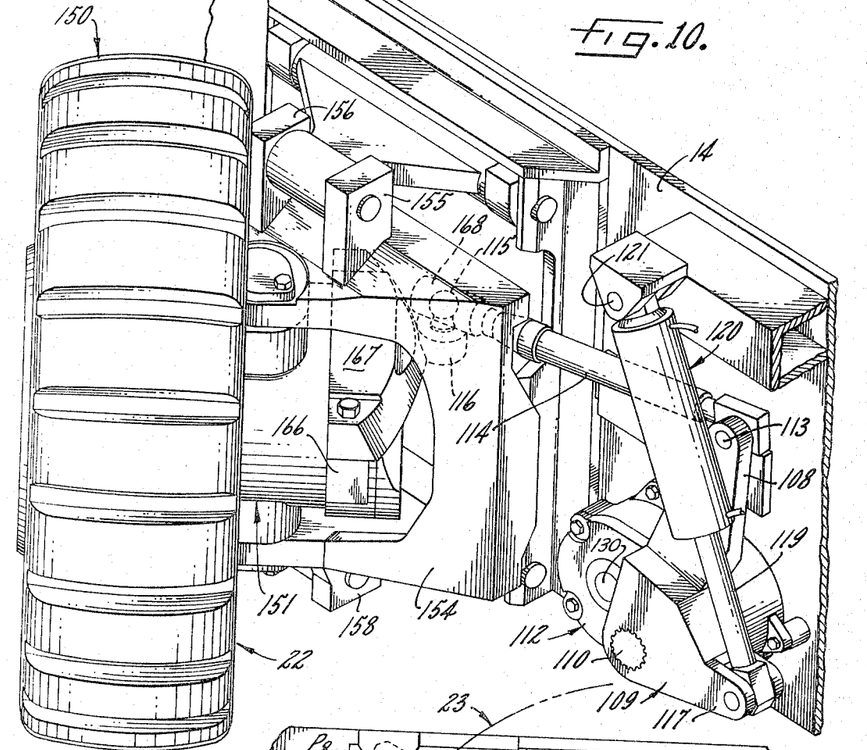
FIGURE 10 is a perspective view as viewed from the plane indicated at 10—10 of FIGURE 1.

A typical wheel assembly and its mounting structure is illustrated in FIGURES 9 and 10.

The wheel assembly includes a wheel 150 and a motor, indicated generally at 151. In this instance the motor and wheel are integral so that each wheel is, in effect, self-propelled. It should be clearly understood, however, that the invention is not limited to such construction since the steering linkage system, except for placement, is independent of the mode by which power is transmitted to the wheel. It is preferable that the motor and wheel be integral since this eliminates traction power transmitting linkages.

The wheel assembly is rotatable about axis 26 which passes through the axial center of a pair of king pins 152, 153 on which the wheel assembly is rotatably mounted. The king pins are supported in a wheel carrier 154 which has upwardly projecting lugs 155, 156 and downwardly projecting lugs 157, 158. The wheel carrier and its lugs form in effect the long side of a parallelogram equalizer linkage whose description and operation is discussed in detail in copending application Serial No. 324,732. Since the structure and function of the equalizer linkage per se is not an essential element of the present disclosure, no detailed description is necessary here. As the haulage vehicle travels over uneven terrain and one wheel assembly is elevated relative to the other, the equalizer linkage functions to maintain both wheel assemblies in firm contact with the ground so that substantially equal traction is applied to each wheel.

Motor 151 includes a housing 165 which has a pair of ears 166 extending outwardly therefrom near its upper rear portion. A collar member 167 is bolted or otherwise suitably secured to the motor housing by bolts or other means which are threadably engaged with the ears 166. The steering lug 116 is welded or otherwise suitably secured to the most inwardly located portion of the collar 167 and ball joint 115 extends upwardly therefrom. The inner end portion 168 of the drag link 114 is shown in section in FIGURE 9.

Valve stabilizer assembly

The pivotal connection between the long crank arm 108 and stabilizer bar 106 is shown best in FIGURE 8. This connection enables the crank arm 108 to swing freely with respect to the stabilizer bar. This construction is repeated at the opposite or front end of stabilizer bar 106 and is also substantially duplicated at each end of the stabilizer bar 76, so that a description of one will suffice for a description of all.

Stub link 107 is pivotally secured at its forwardmost end to crank arm 108 by pin 170. The stub link is secured at its rearward end to stabilizer bar 106 by pin 171, the stub link being spaced from the stabilizer bar by a spacer member 172. A rectangular slotted plate 173 is welded to the outside surface of side wall 14. The plate has an internal recess 174 formed therein, the depth of the recess when added to the thickness of the side wall being slightly greater than the thickness of stabilizer bar 106. The ends of the slot in side wall 14 and the recess are slightly longer than the limits of travel of the stabilizer bar 106 and spacer 172. The limits of travel are defined by the length of stroke of the pistons in cylinder 120. It will be noted that the inside surface of stabilizer bar 106 is substantially flush with the inside surface of side wall 14. The cut-away area 175 of side wall 14 is just sufficient to receive the stabilizer bar with a slight clearance. In order to prevent clogging between the relatively movable surfaces, a thin metal strip or plate 176 may be welded to the inside surface of side wall 14.

Use and operation

The use and operation of the invention is as follows:
When the haulage vehicle travels straight ahead, that is in a direction of travel parallel to the longitudinal axis of the car, the forward and rearward sets of wheel assemblies 22, 23 and 40, 41, respectively, are aligned with the longitudinal axis of the body, as shown in FIGURE 2. The relative vertical positions of the wheels may vary with respect to one another by virtue of the equalizer linkage shown in FIGURES 9 and 10 and described in detail in copending application Serial No. 324,732, but any variance in vertical elevation between the wheels will have no effect on the steering system.

Figure 11:
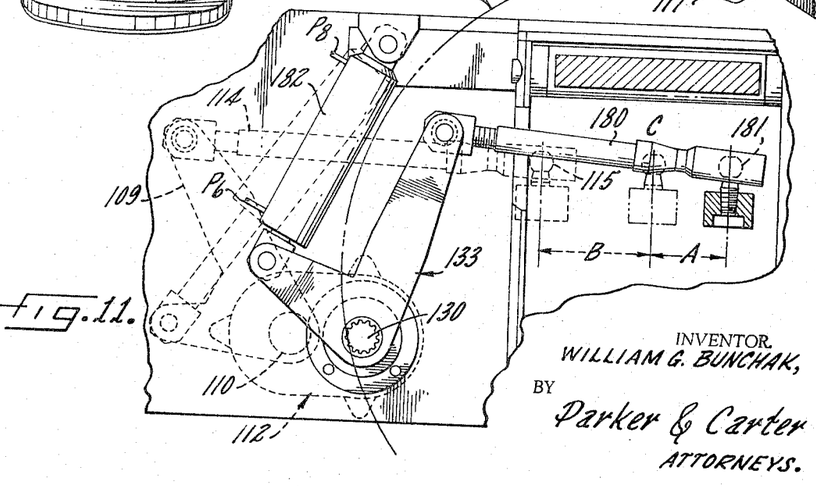
FIGURE 11 is a side view of the differential motion transmitting mechanism shown in FIGURE 4 and illustrating, diagrammatically, the maximum turn and centered positions of the drag links for a pair of oppositely positioned wheel assemblies.

In this condition, the gear members in differential motion transmitting portion of the steering system are located in the FIGURE 7 position. That is, cross shaft 130 and stub shaft 110 are so positioned with respect to one another that the wheels will be pointed straight ahead. Referring to FIGURE 11, drag links 114 of wheel assembly 22, and drag link 180 of wheel assembly 23 will have moved to a position in which the steering knuckle or ball joint 115 of wheel assembly 22, and ball joint 181 of wheel assembly 23 will be in the neutral or centered position C of FIGURE 11. In this position the condition of valves 51 and 99 will be as shown in FIGURE 5.

Now assume the operator wishes to make a maximum turn to the right. Rotation of steering wheel 47 in a counterclockwise direction by the operator rotates ball screw 66 of FIGURES 3 and 5 in a direction to move spool control bracket 67 to the left as indicated by the arrow of FIGURE 5. Bevel gears 64 and 65 change the direction of rotation of the steering wheel force 90 degrees.

Movement of spool control bracket 67 to the left moves valve spool 71 to the left since the valve spool is integrally connected to bracket 67. Initially the valve spool will move relative to the valve casing 72, the casing 72 remaining in its illustrated FIGURE 5 position for the initial increment of movement.

As valve spool 71 moves to the left the return line T is blocked by an appropriate land on the spool, and high pressure fluid from high pressure line P is directed into high pressure lines P1 and P2.

High pressure line P1 is connected to the upper end of power cylinder 52, and high pressure line P2 is connected to the lower end of high pressure cylinder 185. Piston rod 83 of high pressure cylinder 52 will accordingly be extended, thereby rotating crank lever 54 counterclockwise, whereas the piston rod of hydraulic cylinder 185 will be retracted thereby moving its associated bell crank lever counterclockwise as viewed from the left side of the car.

Reference is now made to FIGURES 4 and 6 through 12.

Counterclockwise movement of steering wheel 47 and resultant leftward movement of spool control bracket 67 will result in a similar leftward movement of the spool control sleeve 98 of valve means 99. The valve spool within valve 99 will thereby be moved to a position in which high pressure line P is connected to high pressure lines P5 and P6 and the tank line T blocked off. Since P5 is connected to the upper end of power cylinder 120, piston rod 119 will be extended and lever 109 rotated clockwise about the axis of stub shaft 110. Clockwise rotation of lever 109 moves drag link 114 forward from the illustrated neutral or center position of FIGURE 4 to the forwardmost dotted line position of FIGURE 11. It should be kept in mind when viewing FIGURE 11 that the front end of the car is at the left of the FIGURE whereas in FIGURE 4 the front end of the car is to the right of the figure. The movement of the drag link and accordingly the steering knuckle 115 is indicated by the distance B of FIGURE 11. This distance represents an amplitude of swing of approximately 45 degrees of wheel assembly 22.

Wheel assembly 23 will similarly be swung into a right turn position simultaneously with swing of wheel 22 but the amplitude of swing of wheel 23 will be substantially less than that of wheel 22. That is, high pressure line P6 opens into the lower end of hydraulic cylinder 182 and the cylinder's piston is accordingly retracted. Retracting movement of the piston rod swings lever 133 of FIGURE 11 in a clockwise direction, as viewed from the left side of the haulage vehicle, and moves drag link 180 the distance A of FIGURE 11. That is, prior to connecting pressure lines P5 and P6 to high pressure line P of valve 99, the ball joint 181 was located in the C position of FIGURE 11. The length of movement represented by A in FIGURE 11 represents an amplitude of swing of about 28 degrees of the wheel assembly 23.

It is apparent from the foregoing description that the left rear wheel assembly 41 is rotated in a similar manner.

The structure whereby one wheel assembly is swung simultaneously, but at a less rapid rate than the other wheel assembly so that each wheel assembly remains perpendicular to a radial line passing through a common turning point, is shown best in FIGURES 6, 7 and 12. These figures illustrate the differential motion transmitting means 112 associated with the right front wheel assembly 22. The differential motion transmitting means 60 located near the right rear wheel assembly 40 is substantially the same so that a description of one will suffice for the description of both.

In the FIGURE 7 position, wheel assemblies 22 and 23 are aligned with the longitudinal axis of the car and the relative rotative positions of cross shaft 130 and stub shaft 110 are fixed with respect to one another by virtue of tooth 137 of gear 135 being in meshing engagement with teeth 144 and 145 of pinion gear 143, and tooth 147 of driven gear 146 being in meshing engagement with teeth 139 and 140 of pinion gear 138. As lever means 109 rotates clockwise thereby rotating stub shaft 110 clockwise, the small gear 143 and large gear 146 are rotated the same angular distance. However, substantially upon the commencement of rotation of stub shaft 110, tooth 147 of large gear 146 disengages from teeth 139 and 140 of small driven gear 138. Teeth 144 and 145 of small gear 143 remain in engagement with tooth 137 of large gear 135 so that rotation of stub shaft 110 is positively transmitted to cross shaft 130. The lineal distance teeth 144 and 145 move will be equal to the lineal distance teeth 136 and 137 will move. However, since the pitch diameter of gear 143 is considerably smaller than the pitch diameter of gear 135, the angular displacement of stub shaft 110 will be greater than the angular displacement of cross shaft 130, the difference being proportional to the difference in radii of the pitch circles of gears 143 and 135.

At the extreme limit of rotation of stub shaft 110, that is, when steering knuckle 115 has advanced the distance B from neutral, centered position C, the gears will be in the position shown in FIGURE 12.

It will be apparent that rotation of steering wheel 47 in a clockwise direction will first rotate the gear members 143, 146, 135, 138 back to the FIGURE 7 position, and then continued clockwise rotation of steering wheel 47 will cause disengagement of gears 143 and 135 and turning engagement of gears 146 and 138. Since the pitch radius of gear 146 is greater than the pitch radius of gear 138, the angular displacement of gear 138 and consequently cross shaft 130, will be greater than the angular displacement of gear 146 and stub shaft 110 for the same linear distance of movement. That is, when the steering wheel is rotated clockwise, gear 146 imparts the turning force to cross shaft gear 138 since the outermost pair of gears, 143, 135 will be out of engagement with one another.

The power cylinders, which might also be termed the turning cylinders, 52, 120, 182 and 185 will be activated so long as the spool of valves 51 and 99 is positioned to direct high pressure fluid into high pressure lines P1, P2, P5 and P6, and to block off the tank return lines T from the pump. A stabilizing system for deactivating the power cylinder once the required degree of turn has been accomplished is shown in FIGURES 3, 4 and 5.

It will be recalled that initial movement of spool control bracket 67 connected high pressure line P to lines P1, P2 of valve 51 and blocked off tank return line T from the pump. The result was a counterclockwise movement of lever 54, this counterclockwise movement being translated by the differential motion transmitting mechanism 60 into concurrent movement of wheel assemblies 40 and 41.

Movement of the lever 54 also triggers the stabilizing means. That is, valve casing 72 is connected to the long crank arm 56 of lever means 54 by means of stabilizer bar 76, stub pivot connecting links 78 and 75, and movement multiplying lever 73. As valve casing 72 is dragged to the left by virtue of the counterclockwise movement of crank arm 56, the relative position between spool 71 and casing 72 is changed, the changed position being in effect a re-establishment of the initial, illustrated FIGURE 5 position of the valve. That is, tank return line T is unblocked and the high pressure fluid flowing in line P is returned to the tank, bypassing high pressure lines P1 and P2.

Substantially the identical sequence of events occurs at the forward end of the body structure. That is, valve casing 100 of valve means 99 is connected to lever 109 for rotation therewith by stabilizer bar 106, stub pivot links 105, 107 and multiplying lever 102. Clockwise movement of lever 109 is translated into leftward movement of valve casing 100 since the pivot point 103 of multiplying lever 102 lies between pivot point 101 and the pivotal connection of stub lever link 105 to the multiplying lever 102. It will be recalled that the spool of valve means 99 moved to the left as steering wheel 47 was originally rotated counterclockwise to admit high pressure fluid to lines P5 and P6 of power cylinders 120 and 182, and consequently similar leftward movement of valve casing 100 will re-establish the valve condition of FIGURES 4 and 5 which are identical.

In this instance, it should be noted that multiplying lever 102 is not only a motion multiplying member but it is also a motion reversing lever since leftward movement of the spool of valve 99 results in a rightward movement of stabilizer bar 106 as contrasted to the leftward movement of stabilizer bar 76 induced by leftward movement of spool 71. This reversal of direction of movement of course is due to the fact that the pivot point 103 for the multiplying lever 102 is located intermediate its ends.

After the valve casings of valves 51 and 99 turn to their FIGURE 5 positions, and their neutral positions are re-established, the system is ready for the next steering impulse.

Rotation of steering wheel 47 in a clockwise direction will result in the reverse system changes. That is, valve spool 71 will move to the right blocking tank return line T and connecting lines P3 and P4, which now function as high pressure lines, with a source of high pressure from inlet line P. Lever means 54 of FIGURE 3 will swing clockwise, rather than counterclockwise, and the corresponding lever means associated with wheel assembly 41 will move counterclockwise, rather than clockwise. Similar changes will occur in the valve means and steering system associated with wheel assemblies 22 and 23.

It will be noted that turning movement of the wheels may occur at all times, and quite independently of whether the shuttle car is traveling over level or uneven terrain. This is due to the provision of the two universal joints 92 and 90 which assure transmission of the steering force from the steering wheel 47 to the wheel assemblies irrespective of the relative vertical positions of the front and rear wheels with respect to one another.

One of the most important advantages of the present invention is that the steering linkage assembly is located completely beyond the area of turn of the associated wheel assemblies. That is, even when the wheels are swung to their positions of greatest displacement, as wheels 22 and 40 have done in FIGURE 1, they will not interfere with the power means 52, 120, levers 54, 109 and associated mechanism. The differential motion transmitting means 60 and 112 have been placed outside the area of swing of the wheel and accordingly the permissible swing of each wheel assembly is greatly increased. This is a tremendous advantage because, for the same amplitude of swing as contrasted to present cars, less transverse width is needed and the body chambers 17 and 35 can be made correspondingly larger. In other words the only width limiting factor of the body chambers 17 and 35 is the innermost position the edges of the wheels move to when turned to their most extreme turned position.

It should also be noted that the valves 51 and 99 have a shock absorbing quality provided primarily by their free mounting which enables the valve casings as well as the valve spools to bodily move to new positions at which a condition of equilibrium is established.

Although the invention has been illustrated and described in connection with an articulated six-wheeled shuttle car, it will at once be apparent that this is merely a preferred embodiment and that other variations and embodiments will be apparent to those skilled in the art upon study of the disclosure. It is accordingly intended that the scope of the invention be limited not by the above exemplary description, but solely by the scope of the hereinafter appended claims when interpreted in light of the pertinent prior art.

I claim:

1. A steerable mine haulage vehicle, said mine haulage vehicle including, in combination,
    body structure forming a carrying chamber for material to be transported,
    a first steerable wheel assembly on one end of the body structure and a second steerable wheel assembly located on the other end of the body structure opposite the first wheel assembly each said wheel assembly including a wheel on each side of the vehicle and
    means for imparting an amplitude of swing to each of the steerable wheels sufficient to maintain each of said steerable wheels substantially perpendicular to a radial line passing through the common turning center of each of the steerable wheels,
    said means including
    firstly, a steering linkage operatively connected to each of the steerable wheels and
    secondly, means for applying a turning force to the steering linkages, and
    thirdly, differential motion transmitting means including gears interposed between the means for applying a turning force and the steering linkages,
    said gears including means effective to turn the inside wheel of each wheel assembly through a greater amplitude of turn than the outside wheel of each wheel assembly irrespective of the direction of turn.

2. The steerable haulage vehicle of claim 1 further including stabilizing means for maintaining the wheel assemblies in a non-aligned position with respect to the longitudinal axis of the vehicle upon cessation of the operator applied turning force said stabilizing means having one end portion connected to and movable with one of the steering linkages and the other end portion operatively associated with the turning force applying means, said stabilizing means being effective to cause cessation of the applied turning force in response to movement of the steering linkage to which it is attached.

3. The sterable haulage vehicle of claim 1 further characterized in that at least a portion of each of the steering linkages are located beyond the turning area of its associated wheel.

4. The steerable haulage vehicle of claim 1 further characterized in that the means for applying a turning force to the steering linkage includes a power steering system, said power steering system being effective to simultaneously turn longitudinally aligned wheels in opposite directions.

5. The steerable haulage vehicle of claim 1 further characterized,
    firstly in that each of the steering linkages includes a lever for each wheel, each lever being rotatably mounted on the body structure and connected to an associated wheel,
    each of said wheels being pivotable about a generally vertical axis,
    secondly, in that the turning force applying means includes
    power means carried by the body structure for rotating each lever, and,
    thirdly, in that the means for imparting a differential amplitude of swing to the oppositely located wheels in each set of wheel assemblies includes
    a common cross shaft, and,
    said differential motion transmitting means connecting each lever associated with a set of wheels on opposite sides of the vehicle to a common cross shaft and effective to swing the inside wheel through a greater amplitude of turn than the outside wheel irrespective of the direction of turn.

6. The steerable haulage vehicle of claim 5 further characterized in that said gears, including the means effective to turn the wheels through different amplitudes in each differential motion transmitting means includes
    a pair of identical large gears, and a pair of identical small gears,
    said gears being cross mounted, from pair to pair, on the common cross shaft and rotatable lever, whereby the common cross shaft carries a large gear and a small gear, said last mentioned large and small gears being arranged for meshing engagement with a small gear and a large gear, respectively, carried by the rotatable lever,
    said gears being in mesh when the direction of travel of the wheels is parallel to the longitudinal axis of the haulage vehicle,
    the first set of meshing gears being in driving engagement with one another when the lever is rotated in a first turning direction, and the second set of meshing gears being disengaged, and
    the second set of meshing gears being in driving engagement with one another when the lever is rotated in the opposite turning direction, and the first set of meshing gears being disengaged.

7. The steerable haulage vehicle of claim 5 further characterized in that each lever is a bell crank having a pair of crank arms,
    one crank arm being connected by wheel turning structure to an associated wheel,
    the other crank arm being connected to the power means.

8. The steerable haulage vehicle of claim 5 further characterized, firstly, in that
    the power means are hydraulic cylinders, one cylinder for each lever, each of said cylinders being supported on the body structure and connected to an associated lever for articulation thereof, and, secondly, in that the power system includes
    a source of hydraulic power, and
    valve means under the control of the operator for connecting the source to the hydraulic cylinders to thereby rotate the levers in appropriate directions for turning the wheels.

9. The steerable haulage vehicle of claim 8 further including
    stabilizing means for maintaining the wheels in their turned positions until reception of a subsequent steering force from the operator.

10. The steerable haulage vehicle of claim 9 further characterized, firstly, in that the valve means includes a spool member and a housing member, one of said members being under the direct control, by mechanical linkage, of the operator, said members, when in a first condition, connecting the source of hydraulic power to the cylinders and, when in a second condition, disconnecting the source of hydraulic power from the cylinders, and, secondly, in that the stabilizing means includes a link connected at one end to one of the aforesaid members, and movable with and connected at the other end to one of the levers, said link, when moved with the lever, being constructed and arranged to reestablish the condition which existed prior to movement of the lever.

11. The steerable haulage vehicle of claim 10 further characterized in that the link is conected to the housing member.

12. Mechanism for maintaining each wheel in a pair of wheel assemblies which are spaced from one another substantially perpendicular to a radial line extending from each wheel through a common turning center, said mechanism including in combination, a shaft assembly, a pair of levers, one lever being mounted on and rotatable with one end portion of the shaft assembly, and the other lever being mounted for rotation about an axis which is parallel to the axis of the shaft assembly, each lever being connected to a wheel in turning relationship therewith, and differential motion transmitting means including gears connecting said other lever to the shaft assembly effective to swing the radially innermost wheel through a greater amplitude of swing than the radially outermost wheel irrespective of the location of the turning center.

13. The mechanism of claim 12 further characterized in that said gears, including the means effective to turn the wheels through different amplitudes in each differential motion transmitting means includes a pair of identical large gears, and a pair of identical small gears, said gears being cross mounted, from pair to pair, on the common cross shaft assembly and said rotatable other lever, whereby the common cross shaft assembly carries a large gear and a small gear, said large and small gears being arranged for meshing engagement with a small gear and a large gear respectively carried by the said rotatable other lever, said gears being in mesh when the direction of travel of the wheels is parallel to the longitudinal axis of the haulage vehicle, the first set of meshing gears being in driving engagement with one another when the lever is rotated in a first turning direction, and the second set of meshing gears being disengaged, and the second set of meshing gears being in driving engagement with one another when the lever is rotated in the opposite turning direction, and the first set of meshing gears being disengaged.

14. A steering system for vehicles having plural pairs of wheel assemblies for turning and maintaining each wheel in a pair of wheel assemblies which are oppositely spaced from one another nominally perpendicular to a radial line extending from each wheel through a common turning center, said system including, in combination, steering means, power means, one for each wheel assembly, for turning each wheel, valve means controlled by the steering means for alternately connecting and disconnecting the wheel turning power means to a source of power, and means for imparting an amplitude of swing to each wheel sufficient to maintain each wheel nominally perpendicular to an associated radial line passing through a common turning center irrespective of the location of the common turning center, said means for imparting an amplitude of swing to each wheel including differential motion transmitting gear means interposed between the power means and the wheels.

said differential motion transmitting gear means being effective to turn the inside wheel through a greater amplitude of turn than the outside wheel irrespective of the direction of turn.

15. The steering system of claim 14 further including stabilizing means for maintaining said wheels in their turned position until reception of a subsequent steering force from the steering means.

16. The steering system of claim 15 further characterized firstly, in that the valve means is bodily shiftable, and secondly, in that the stabilizing means includes a linkage connected at one end to the valve means and at the other end to a movable lever which is operatively connected in power transferring relationship to the power means and wheel, said linkage being effective, after initial operation of the valve means in which the power means is connected to the power source, to establish a subsequent condition of the valve means in which the power means is disconnected from the power source.

17. The steering system of claim 14 further characterized, firstly, in that the steering means includes a pair of levers for each pair of wheel assemblies, one lever for the wheel of each wheel assembly, each lever being rotatably mounted on the vehicle body structure and connected to an associated one of the pair of oppositely located wheel assemblies, each of said wheels being pivotable about a generally vertical axis, and secondly, in that the power means are carried by the vehicle body structure for rotating the levers, and, the means for imparting a differential amplitude of swing to the wheels of the oppositely located wheel assemblies includes a common cross shaft which carries one of said levers at one end portion, and said differential motion transmitting gear means connecting the other lever to the other end portion of the common cross shaft, said differential motion transmitting gear means being effective to swing the inside wheel assembly through a greater amplitude of turn than the outside wheel assembly irrespective of the direction of turn.

18. The steering system of claim 17 further characterized in that the differential motion transmitting gear means includes a pair of identical large gears, and a pair of identical small gears, said gears being cross mounted, on the common cross shaft and rotatable lever, whereby the common cross shaft carries a large gear and a small gear, said large and small gears being arranged for meshing engagement with a small gear and a large gear, respectively, carried by the rotatable lever, said gears being in mesh when the direction of travel of the wheel assemblies is parallel to the longitudinal axis of the vehicle, the first set of meshing gears being in driving engagement with one another when the lever is rotated in a first turning direction, and the second set of meshing gears being disengaged, and the second set of meshing gears being in driving engagement with one another when the lever is rotated in the opposite turning direction, and the first set of meshing gears being disengaged.

19. The steering system of claim 17 further characterized in that each lever is a bell crank having a pair of crank arms, one crank arm being connected by wheel turning structure to an associated wheel assembly, the other crank arm being connected to the power means.

20. The steering system of claim 19 further including a source of hydraulic power, and further characterized, firstly in that the power means are hydraulic cylinders, one cylinder for each lever, each of said cylinders being supported on the vehicle body structure and connected to an associated lever for articulation thereof, and, secondly, in that the valve means are under the control of an operator and function to connect said source to the hydraulic cylinders to thereby rotate the levers in appropriate directions for turning the wheel assemblies.

21. A steerable haulage vehicle, said haulage vehicle including, in combination, body structure forming a carrying chamber for material to be transported, six wheel assemblies supporting the body structure, said six wheel assemblies including a set of steerable wheel assemblies adjacent the rear end portion of the vehicle, a set of steerable wheel assemblies adjacent the forward end portion of the vehicle, and a set of non-steerable wheel assemblies located intermediate the steerable wheel assemblies, each set of wheel assemblies including at least a first wheel assembly on one side of the body structure and a second wheel assembly located on the other side of the body structure opposite the first wheel assembly, propelling means for propelling the vehicle, steering means, a power steering system for turning the wheel assemblies in each end set of steerable wheel assemblies in response to a turning force applied to the steering means, and means for imparting an amplitude of swing to each of the steerable wheel assemblies sufficient to maintain each of said steerable wheel assemblies nominally perpendicular to an associated radial line passing through the common turning center of each of the steerable wheel assemblies, said means for imparting an amplitude of swing to each wheel assembly including differential motion transmitting gear means interposed between the power steering system and the wheel assemblies, said differential motion transmitting gear means being effective to turn the inside wheel assembly in each set of steerable wheel assembies through a greater amplitude of turn than the outside wheel assembly irrespective of the direction of turn.

22. A steerable haulage vehicle, said haulage vehicle including body structure forming a carrying chamber for material to be transported, a set of steerable wheel assemblies adjacent the forward end portion of the vehicle, a set of steerable wheel assemblies adjacent the rear end portion of the vehicle, each of said sets of steerable wheel assemblies including a first steerable wheel on one side of the body structure and a second steerable wheel located on the other side of the body structure opposite the first wheel assembly, means for imparting an amplitude of swing to each of the steerable wheels sufficient to maintain each of said steerable wheels substantially perpendicular to a radial line passing through the common turning center of each of the steerable wheels, said means including, firstly, a steering linkage operatively connected to each of the steerable wheels, said steering linkage for each steerable wheel including an elongated member connected to said wheel and extending therefrom towards the nearest end of the vehicle to a location beyond the turning area of the wheel, and secondly, means for applying a turning force to the steering linkages, thirdly, differential motion transmitting means including gears, interposed between the means for applying a turning force and the steering linkages, said gears including means effective to turn the inside wheel of each wheel assembly through a greater amplitude of turn than the outside wheel of each wheel assembly irrespective of the direction of turn, all of each of the turning force applying means and all of each of the steering linkages except the elongated members being located outside of the turning area of the wheel assembly, each of said elongated members being located between the associated wheel and the side of the vehicle body and connected to said turning force applying means at a point beyond the turning area of its associated wheel.

References Cited by the Examiner

UNITED STATES PATENTS

| | | | |
|---|---|---|---|
| 1,719,875 | 7/1924 | Cooper | 180—79.2 |
| 2,555,649 | 6/1951 | Krotz | 180—79.2 X |
| 2,674,333 | 4/1954 | Zeilman et al. | 180—79.2 |
| 2,910,131 | 10/1959 | Krotz | 180—45 |
| 2,962,176 | 11/1960 | Russell. | |
| 3,087,564 | 4/1963 | Quayle | 180—79.2 |
| 3,183,991 | 5/1965 | Gamaunt | 180—24 |
| 3,185,245 | 5/1965 | Hoyt | 180—79.2 |
| 3,185,324 | 5/1965 | Breithaupt et al. | 180—22 X |

A. HARRY LEVY, *Primary Examiner.*